United States Patent [19]

Tsuji

[11] Patent Number: 5,068,540
[45] Date of Patent: Nov. 26, 1991

[54] DISTANCE MEASURING APPARATUS HAVING AUTOMATIC GAIN CONTROL

[75] Inventor: Takahiro Tsuji, Osaka, Japan

[73] Assignee: Ricoh Company, Ltd., Tokyo, Japan

[21] Appl. No.: 561,327

[22] Filed: Aug. 1, 1990

[30] Foreign Application Priority Data

Aug. 4, 1989 [JP] Japan ................................. 1-203437

[51] Int. Cl.$^5$ ........................................... G01N 21/86
[52] U.S. Cl. ............................. 250/561; 250/214 AG; 356/4
[58] Field of Search ............ 250/201.2, 214 AG, 561, 250/201.4, 201.6; 356/1, 4

[56] References Cited

U.S. PATENT DOCUMENTS

| | | | |
|---|---|---|---|
| 4,522,492 | 6/1985 | Masunaga | 250/201.6 |
| 4,537,510 | 8/1985 | Takahasi | 250/214 AG |
| 4,601,574 | 7/1986 | Yamane et al. | 250/201.6 |
| 4,768,876 | 9/1988 | Okino | 356/4 |
| 5,008,532 | 4/1991 | Ono et al. | 250/214 AG |
| 5,008,695 | 4/1991 | Nagaoka et al. | 356/1 |

FOREIGN PATENT DOCUMENTS

| | | |
|---|---|---|
| 58-95210 | 6/1983 | Japan . |
| 62-15123 | 4/1987 | Japan . |
| 62-30363 | 7/1987 | Japan . |
| 62-34082 | 7/1987 | Japan . |
| 64-15907 | 1/1989 | Japan . |

Primary Examiner—David C. Nelms
Assistant Examiner—Stephone B. Allen
Attorney, Agent, or Firm—Oblon, Spivak, McClelland, Maier & Neustadt

[57] ABSTRACT

A distance measuring apparatus comprises a light emitting device for emitting infrared light blinking at a constant frequency toward an object, and a light receiving device for receiving infrared light reflected from the object. The light receiving device can generate two output signals which correspond respectively to positive and negative amounts of deviation of a position of light received therein with respect to a center thereof. The output signals are amplified by amplifiers, respectively. A signal component having a frequency corresponding to the blink frequency of the infrared light is picked up by a picking-up circuit from each of the output signals of the amplifiers. A distance determining device is provided to determine a distance to the object on the basis of the signal components. A gain control circuit for controlling gains of the amplifiers includes a pair of resistor circuits each having a changeable resistance for determining the gain of the corresponding amplifier. A comparator compares in magnitude one of the signal components with a reference voltage and generates a control signal having modes which change with the difference in magnitude between the signal component and the reference voltage. A resistance changing circuit is operative to change the resistance of each of the resistor circuits in accordance with the modes of the control signals.

8 Claims, 4 Drawing Sheets

DISTANCE MEASURING APPARATUS HAVING AUTOMATIC GAIN CONTROL

BACKGROUND OF THE INVENTION

The present invention relates generally to an apparatus for measuring a distance to an object by means of triangulation using infrared light which is emitted from the light emitting device to the object.

Distance measuring apparatuses have been used in variable applications such as cameras, surveying instruments, position sensors, robots, object sensors, collision preventing apparatuses, automatic doors or the like.

In an exemplary distance measuring device, infrared light is emitted from a light emitting diode (LED) toward an object and is then reflected from the object to a position sensing device (PSD) which can generate two output signals corresponding to positive and negative amounts of deviation of infrared light received therein with respect to a center thereof. Exemplarily, the LED is driven to turn on and off at a constant frequency so that infrared light blinking at a constant frequency can be emitted therefrom. Such infrared light emitted from the LED passes through a first lens toward an object. The infrared light reflected from the object is then received in the PSD through a second lens which is spaced from the first lens. When the infrared light is received in the PSD, the PSD generates two output signals which correspond respectively to positive and negative amounts of deviation of the light received in the PSD with respect to the center thereof. According to a principle of triangulation, a distance to the object can be obtained with a relatively high accuracy by obtaining a ratio of one of the output signals of the PSD to the other.

However, when a distance to an object is longer than about ten meters, output signals of the PSD becomes extremely small, resulting in an extreme deterioration of precision of measurement. Also, when external lights are too intensive, it becomes impossible to measure a distance with a sufficient accuracy even if though a distance to an object is shorter than about ten meters.

In order to solve these problems, it can be considered to increase an output of the LED. This, however, causes the life of the LED to be shortened.

As another method for solving the above-described problems, Japanese Unexamined Utility Model Publication No. 64-15907, published on Jan. 26, 1990, discloses means for measuring a distance to an object, in which a pair of amplifier are provided for amplifying two output signals of the PSD, respectively, and a signal pick-up circuit including a pair of filters and detectors is provided for picking up a signal component having a frequency which corresponds to a frequency of blinking of infrared light from each of the output signals so as to identify the infrared light received in the PSD from external lights which ar also received in the PSD. Gain controlling means are further provided for automatically changing gains of the amplifiers in such a manner that when, for example, a signal component picked up from one of the output signals is smaller in magnitude than, a predetermined level, it causes the gains of the amplifier to be increased. This publication, however, does not disclose a specific internal construction of the gain controlling means.

SUMMARY OF THE INVENTION

It is therefore an object of the present invention to provide a specific distance measuring apparatus which uses a light emitting device for emitting infrared light toward an object and a light receiving device for receiving the infrared light reflected from the object and which makes it possible to increase a measurable distance to the object without increasing an output power of the light emitting device.

Further object of the invention is to provide specific distance measuring apparatus which uses a light emitting device for emitting infrared light toward an object and a light receiving device for receiving the infrared light reflected from the object and which can perform measurement of distance to the object with a substantially fixed, sufficient accuracy through a wide range of distances to the object without increasing an output power of the light emitting device even when the distance to the object is too large.

The objects of the invention can be achieved by a distance measuring apparatus comprising a light emitting device for emitting infrared light blinking at a constant frequency toward an object, a light receiving device for receiving infrared light reflected from the object, the light receiving device being adapted to generate two output signals which correspond respectively to positive and negative amounts of deviation of a position of light received therein with respect to a center thereof, a pair of amplifiers for amplifying the output signals of the light receiving device, respectively, means for picking up signal components, each having a frequency corresponding to the blink frequency of the infrared light, from the output signals of the amplifiers, respectively, means for determining a distance to the object on the basis of the signal components picked up by the picking up means, and means for controlling a gain of each of the amplifiers, the controlling means including: a pair of resistor circuits each having a changeable resistance for determining the gain of corresponding one of the amplifiers; a comparator which compares in magnitude one of the signal components with a reference voltage and generates a control signal having modes which change with the difference in magnitude between one of the signal components and the predetermined voltage; and means for changing the resistance of each of the resistor circuits in accordance with the modes of the control signal of the comparator.

In the apparatus having the above-mentioned construction, the light receiving device can generate two output signals each including a signal component which corresponds to the infrared light, and other components which correspond to external light. The more the distance to an object is increased, the more the infrared light which has been reflected by the object and then received in the light receiving device becomes weak, causing the signal component, corresponding to the infrared light and included in each of the output signals generated by the light receiving device, to be lowered in magnitude. The output signals are amplified by the amplifiers, respectively. Thereafter, the signal component corresponding to the infrared light are picked up by the picking-up means from each of the output signals of the amplifiers. The distance to the object is then determined on the basis of the two signal components which are picked up from the output signals of the amplifiers, respectively. An accuracy of measurement of distance to an object is affected by the decrease in magnitude of the signal components supplied to the distance determining means. According to the invention, one of the signal components is compared in magnitude with the reference voltage in the comparator of the controlling means. The comparator can generates a control signal having modes which change with the difference in magnitude between the signal component and the reference voltage. On the other hand, the gain of each of the amplifiers can be changed by changing the resistance of each of the resistor circuits of the controlling means, and the resistance of each of the resistor circuits are changed by the changing means of the controlling means in accordance with the modes of the control signal of the comparator so as to cause the signal components to be picked up by the picking-up at a predetermined constant level which is substantially equal in magnitude to that of the reference voltage.

Accordingly, measurement of distance to the object can be performed with a substantially fixed, sufficient accuracy through a wide range of distances without increasing the output power of the light emitting device even when the distance to the object is too large. Therefore, it is possible to increase a measurable distance to the object without increasing an output power of the light emitting device.

Further objects, features and advantages of the invention will become apparent from the following description of the preferred embodiments of the present invention as illustrated in the accompanying drawings.

DESCRIPTION OF THE PREFERRED EMBODIMENTS

Figure 1:
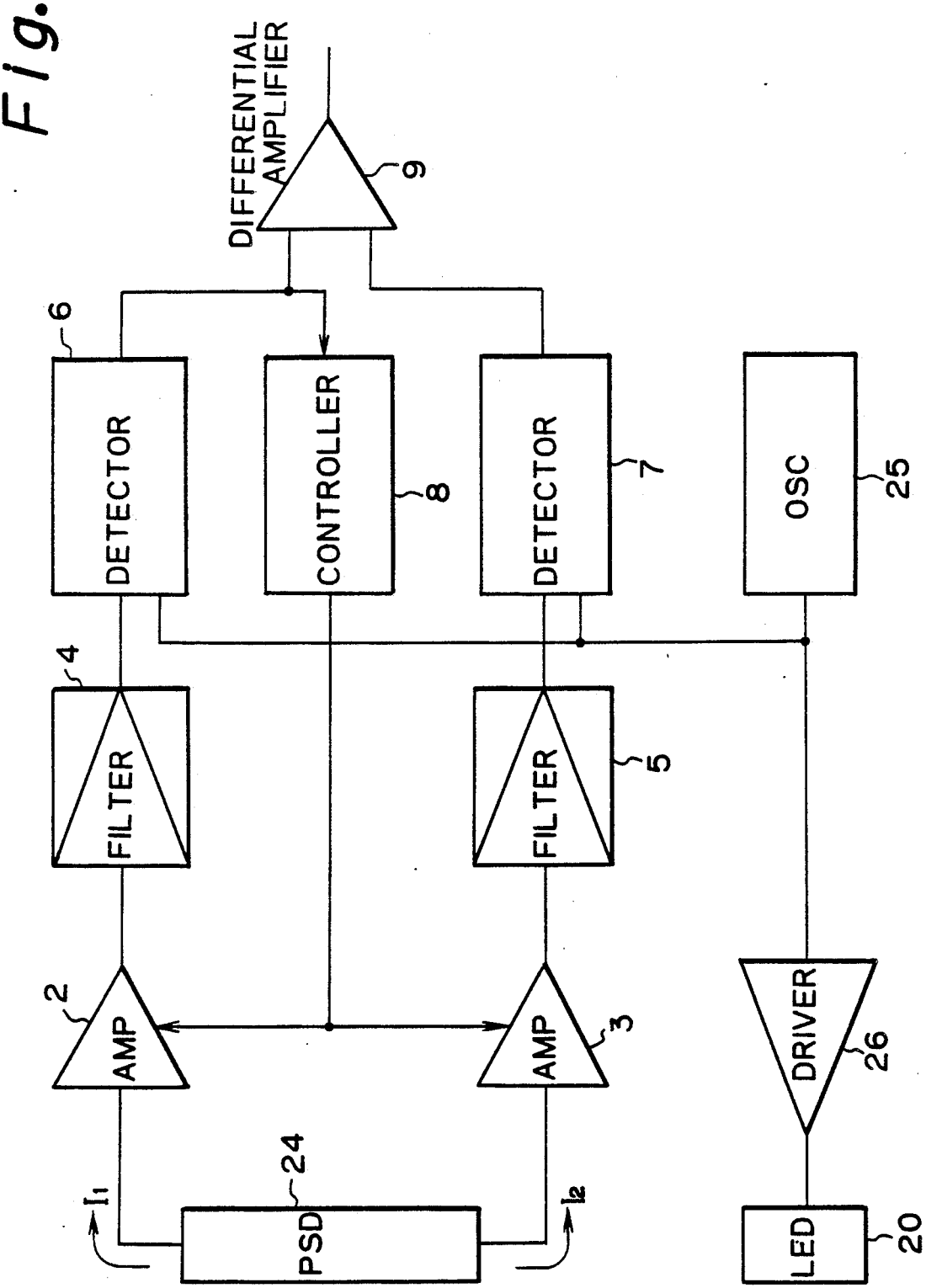
FIG. 1 is a schematical block diagram illustrating one embodiment of a distance measuring apparatus according to the present invention.

Referring first to FIG. 1, there is schematically shown a distance measuring apparatus according to the present invention, in which a light emitting diode (LED) 20 for emitting infrared light toward an object to be measured is connected to a driver 26 which, in turn, is connected to an oscillator (OSC) 25.

It is to be understood that the term "infrared light" used herein and also used in the appended claims may include near-infrared light.

The OSC 25 is constructed to generate an output signal having a constant frequency within, for example, a range from the order of several tens kilohertz to the order of several hundreds kilohertz. The LED 20 is driven by the output signal of the OSC 25 through the driver 26 to turn on and off at a constant frequency corresponding to that of the output signals, causing the infrared light emitted therefrom to blink at a constant frequency which corresponds to that of the output signal of the OSC.

The apparatus comprises a position sensing device (PSD) 24 as a light receiving device. The PSD 24 has an elongated light receiving surface.

Figure 6:
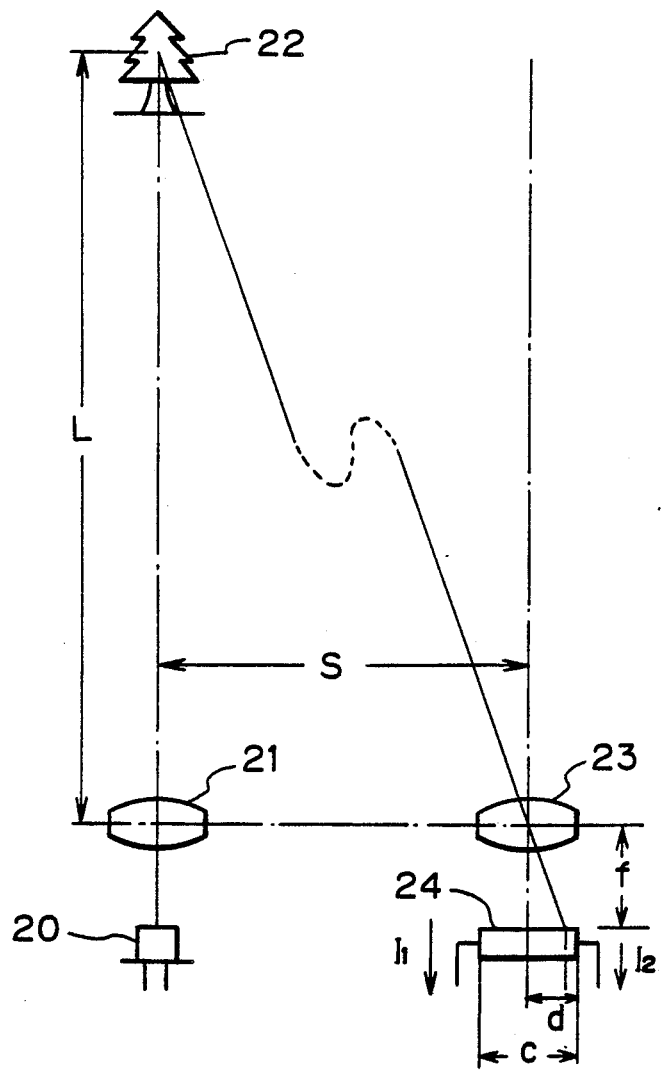
FIG. 6 is a schematical view for explaining a principle of distance measuring method using a light emitting device and a position sensing device.

FIG. 6 schematically shows a method for measuring a distance to an object 22, in which a principle of triangulation using the LED 20 and the PSD 24 is utilized. Referring to FIG. 6, the infrared light emitted from the LED 20 passes through a first lens 21 toward the object 22 at which the infrared light is then reflected. The infrared light reflected back from the object 22, as well as other external lights, passes through a second lens 23 and is then received in the form of a spot light in the light receiving surface of the PSD at a position which corresponds to a distance L to the object 22. The PSD 24 has two output terminals from which two electric currents $I_1$ and $I_2$ which correspond respectively to positive and negative amounts of deviation of a position of light received in the PSD with respect to a center of the light receiving surface of the PSD are generated as output signals. If it is deemed that only the infrared light is received in the light receiving surface of the PSD 24, the electric currents $I_1$ and $I_2$ generated from the PSD can be represented by the following equations, respectively.

$$I_1 = k(c/2 - d) \tag{1}$$

$$I_2 = k(c/2 + d) \tag{2}$$

In these equations, k represents a fixed numeral depending on distances to objects, c represents the length of the PSD, and d represents an amount of deviation from the center of the PSD.

On the other hand, as seen from FIG. 6, the distance L to the object 22 can be represented as $$S/L = d/f \tag{3}$$

in which S represents a distance between the first and second lenses 21 and 23, and f represents a distance between the second lens 23 and the PSD 24. The equations (1) and (2) can be rewritten as $$I_1 = k(c/2 - f \cdot S/L) \tag{4}$$

$$I_2 = k(c/2 + f \cdot S/L) \tag{5}$$

From equations (4) and (5), the following relationship is obtained.

$$I_1/I_2 = (c/2 - f/S/L)/(c/2 - f/S/L) \tag{6}$$

Since c, f and S are predetermined. Therefore, according to the equation (6), the distance L to the object 22 can be determined by detecting a ratio of $I_1$ to $I_2$.

However, in fact, the PSD 24 generates two output signals $I_1$ and $I_2$ each including not only a signal component which corresponds to the infrared light but also other components which correspond to external lights. Accordingly, it is necessary to pick up a signal corresponding to the infrared light from each of the output signals of the PSD 24.

Referring again to FIG. 1, a pair of amplifiers 2 and 3 are provided for amplifying the output signals $I_1$ and $I_2$ of the PSD 24, respectively. A pair of filters 4 and 5 are connected to the amplifiers 2 and 3, respectively. Each of the filters 4 and 5 may be a band-pass filter such as tank filter or ceramic filter. Each of the filters 4 and 5 allows certain frequencies of signals from the corresponding amplifier to pass while stopping others. The certain frequencies includes a frequency corresponding to the blinking frequency of the infrared light. A pair of detectors 6 and 7 are connected to the filters 4 and 5, respectively. Each of the detectors 6 and 7 is operative to pick up only a signal component having a frequency which corresponds to the blinking frequency of the infrared light from the signals passed through the corresponding filter. Each of the detectors 6 and 7 is controlled by the OSC 25 to operate simultaneously with the operation of turning on and off of the LED 20. Each of the detectors 6 and 7 includes a smoothing circuit (not shown in FIG. 1), and is able to generate output signal in the form of a direct current. The filters 4 and 5 and the detectors 6 and 7 together constitutes a picking-up means for picking up signal components, each having a frequency corresponding to the blink frequency of the infrared light, from the output signals of the amplifiers, respectively. A differential amplifier 9 is provided for determining a distance to the object on the basis of the signal components picked up by the picking up means. More specifically, the differential amplifier 9 can generate a differential signal as a distance measurement signal from the output signals of the detectors 6 and 7. The output signal of the differential amplifier 9 may be used, for example, in an auto-focusing system of a camera.

A gain control circuit 8 is provided for controlling a gain of each of the amplifiers 2 and 3. The output signal of one of the detectors 6 and 7 is input to the control circuit 8, and thus a control signal is generated therein. The control signal is used to automatically control the gain of each of the amplifiers 2 and 3.

Figure 5:
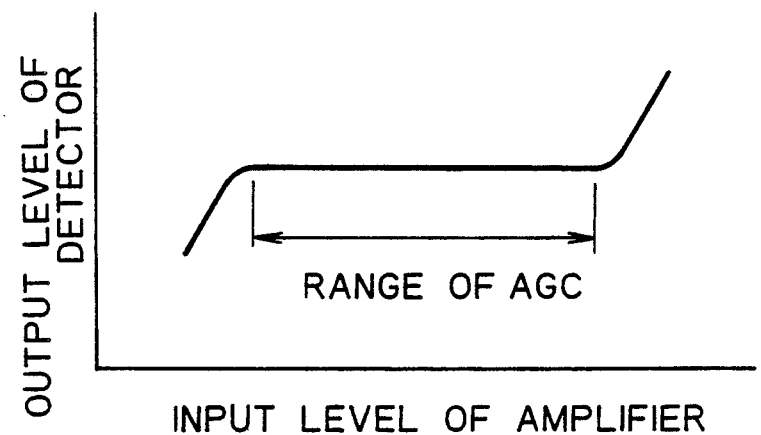
FIG. 5 is a view for explaining an example of characteristics of an automatic gain control (AGC) performed by a gain control circuit used in the apparatus shown in FIG. 2.

FIG. 5 shows an example of characteristics of an automatic gain control (AGC) performed by the control circuit 8. Due to AGC of the amplifiers 2 and 3, a substantially constant output level of each of the detectors 6 and 7 can be obtained during changes in an input level of each of the amplifiers 2 and 3, as shown in FIG. 5. This means that the measurement of distance to the object can be performed with a substantially fixed, sufficient accuracy through a wide range of distances to the object without increasing an output power of the LED 20 even when the distance to the object is longer than, for example, ten meter and that it becomes possible to increase a measurable distance to the object without increasing an output power of the LED. Further, since the distance measurement signal of the differential amplifier 9 is determined by the $I_1-I_2$ ratio rather than by the absolute value thereof, as seen from the equation (6), the accuracy of measurement is not affected by the control of magnitude of the gain of each of the amplifiers 2 and 3.

Explanation will now be made as to a more specific construction of the invention with reference to FIGS. 2 and 3.

Figure 2:
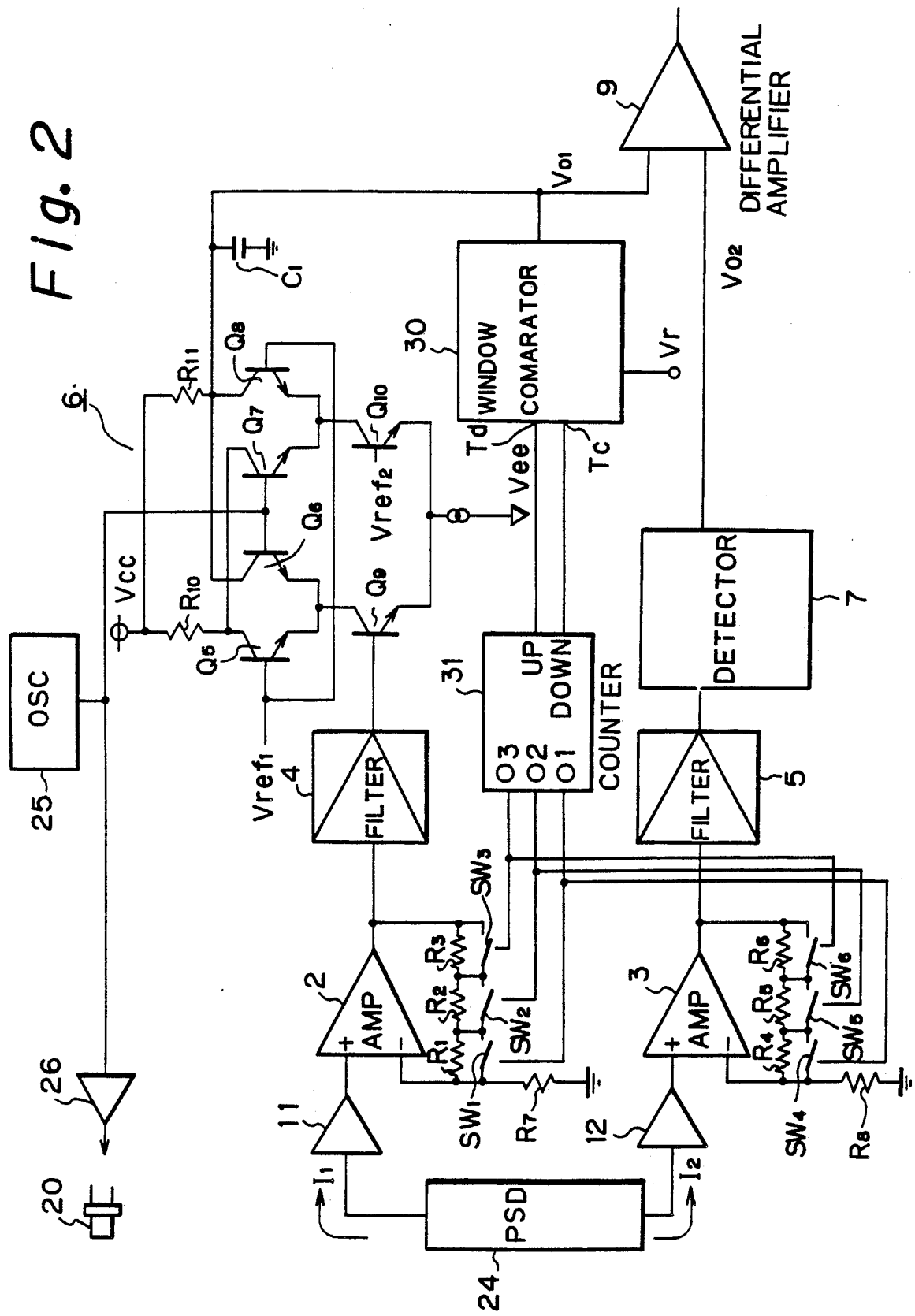
FIG. 2 is a more specific block diagram illustrating the embodiment shown in FIG. 1.

In FIG. 2, the detector 6 and the gain control circuit 8 of the distance measuring apparatus are shown with specific constructions, respectively, and the same or similar constituent elements as those shown in FIG. 1 are denoted by the same reference numerals or characters, respectively.

Referring to FIG. 2, the electric currents $I_1$ and $I_2$ from the PSD 24 are first converted to voltages, respectively, while being amplified by the amplifiers 11 and 12. The output signals of the amplifiers 11 and 12 are then input to non-inverted input terminals of the operation amplifiers 2 and 3, respectively.

The detector 6 is shown as a dual-balancing detector. The other detector 7 has the same construction as that of the detector 6. The detector 6 includes a pair of transistors Q9 and Q10 having emitters, respectively, which are connected through a constant-current circuit to a supply for supplying a voltage Vee which is lower than a level of ground (GND). The transistors Q9 and Q10 together constitute a differential-amplifying circuit. The transistor Q9 has a base to which an output signal of the filter 4 is supplied. The transistor Q10 has a base to which a reference voltage Vref is supplied. The output signal of the differential-amplifying circuit (Q9, Q10) is supplied to an emitter of a differential-amplifying circuit which is constituted by a pair of transistors Q5 and Q6. The output signal of the differential-amplifying circuit (Q9, Q10) is also supplied to an emitter of a differential-amplifying circuit which is constituted by a pair of transistors Q7 and Q8. The transistors Q6 and Q7 have bases, respectively, to which the output signal of the oscillator (OSC) w25 for causing the LED 20 to turn on and off is supplied. The transistors Q5 and Q8 have bases, respectively, to which a reference voltage $Vref_1$ is supplied. The transistors Q6 and Q7 can perform switching operations, respectively, in accordance with the signal from the OSC 25.

In the detector 6, a full-wave rectified signal can be amplified by both the differential-amplifying circuit (Q5 and Q6) and the differential-amplifying circuit (Q7 and Q8). A smoothing capacitor C1 serves to convert the rectified signal to a direct signal.

On the other hand, the gain control circuit 8 comprises a window comparator 30 having an input terminal to which an output signal $V_{01}$ of the detector 6 is supplied and in which the signal $V_{01}$ is compared with a reference voltage Vr. The window comparator 30 can generate two output signals as the control signal having modes which change with a difference between the signal $V_{01}$ and the reference voltage Vr, as described later in more detail.

The control signal of the comparator 30 is supplied as an up-mode or down-mode signal from two output terminals Tc and Td of the comparator to an up-down counter 31 through two input terminals of the counter 31. The counter 31 can generate output signal from one of three output terminals 01, 02 and 03 which are selected in accordance with the modes of the control signal of the comparator.

In order to determine the gain of the amplifier 2, a resistance circuit having a series of resistors R1, R2 and R3 is connected between an output terminal of the amplifier 2 and an inverted input terminal thereof, The resistor R1, R2 and R3 are provided in parallel connection with switches SW1, SW2 and SW3, respectively. Similarly, in order to determine the gain of the amplifier 3, a resistance circuit having a series of resistors R4, R5 and R6 is connected between an output terminal of the amplifier 3 and an inverted input terminal thereof. The resistors R4, R5 and R6 are provided in parallel connection with switches SW4, SW5 and SW6, respectively. The resistors R1, R2 and R3 have different resistances such that, for example, the ratio of the resistances are R1:R2:R3 = 1:2:4. Also the resistors R4, R5 and R6 have different resistances such that, for example, the ratio of the resistances are R1:R2:R3 = 1:2:4.

The switches SW1 and SW4 re together on-off controlled when the output signal is generated from the output terminal 01 of the counter 31, while the switches SW2 and SW5 are together on-of controlled when he output signal is generated of the output terminal 02, and the switches SW3 and SW6 are together on-off controlled when the output signal is generated form the output terminal 03. Each of the switches SW1 to SW6 is made off when the output signal of the counter 31 is in a high level and is made off when the output signal of the counter 31 is in a low level.

In the up-down counter 31, when the control signal is supplied as the up-mode control signal to the counter from the comparator, the output terminals 01, 02 and 03 are successively activated to generate the output signal having a high level in a direction form the terminal 01 to the terminal 03, while when the control signal is supplied as the down-mode control signal to he counter, the output terminals 01, 02 and 03 are successively activated to generate the high-level output signal in a direction for the terminal 03 to the terminal 01.

Figure 3:
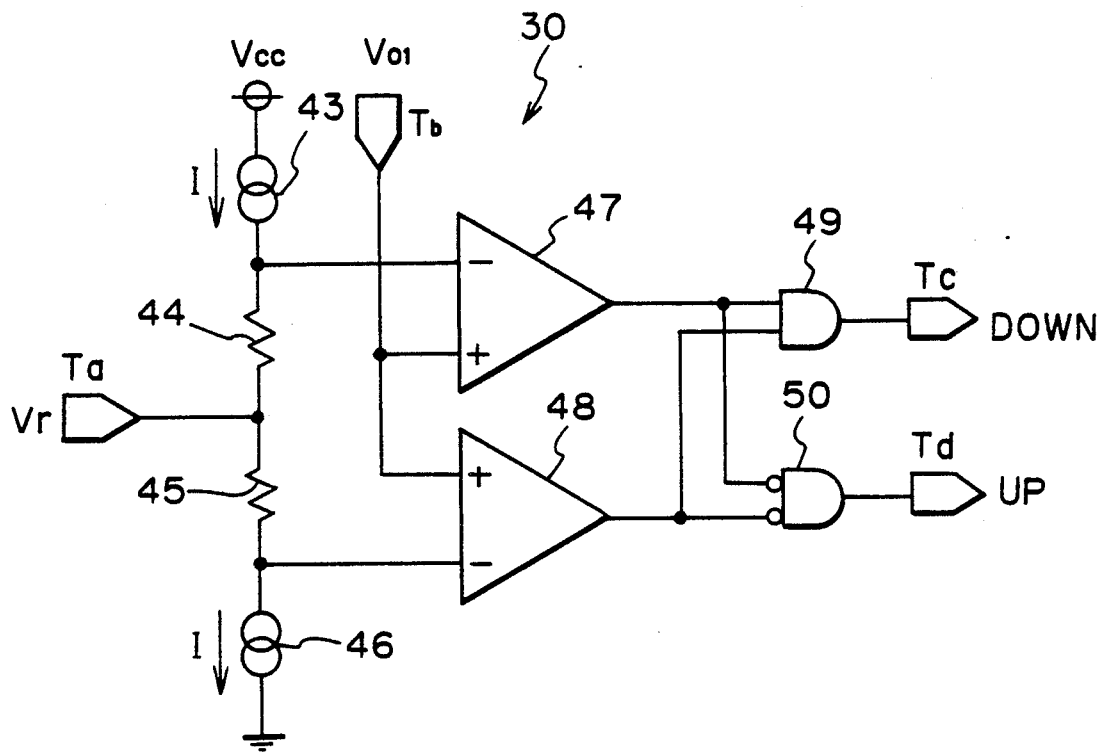
FIG. 3 is a circuit diagram illustrating an example of a window comparator used in the apparatus shown in FIGS. 1 and 2.

FIG. 3 shows an example o a specific construction of the window comparator 30.

Referring to FIG. 3, the comparator has two input terminals Ta and Tb, and tow output terminals Tc and Td. The input terminal Ta serves to input the voltage Vr and is connected t a series circuit including two constant-current supplies 43 and 46, and two resistors 44 and 45 at a junction point between the resistors 44 and 45 which, in turn, are disposed between the supplies 43 and 46. A junction point between the supply 43 and the resistor 44 is connected to an inverted input terminal of a comparator 47, while a junction point between the resistor 45 and the supply 46 is connected to an inverted input terminal of a comparator 48. An output signal $V_{01}$ of the detector 6 is supplied to a non-inverted input terminal foe each of the comparators 47 and 48. Output terminals of the comparators 47 and 48 are connected to an AND gate 49 which serves to generate the up-mode control signal through an output terminal Tc thereof. The output terminals of the comparator 47 and 48 are also connected to a NOR gate 50 which serves to generate the down-mode control signal through an output terminal Td thereof.

In the window comparator 30 shown in FIG. 3, when the electric currents from the supplies 43 and 46 is given as I, and the resistances of the resistors 44 and 45 is given as R, a threshold level of the window comparator 30 at the higher-level side thereof can be represented as $Vr+I\cdot R$, while a threshold level of the window comparator 30 at the lower-level side thereof can be represented as $Vr-I\cdot R$. The output signal $V_{01}$ supplied to the comparators 47 and 48 through the input terminal Tb is compared with each of the threshold levels in the comparators 47 and 48, causing the up-mode or down-mode control signal to be generated from the gates 49 and 50 through the output terminals Tc and Td to the up-down counter 31 (FIG. 2).

The outputs of the comparators 47 and 48, as well as the signal levels of the output terminals Tc and Td, and the modes of operation the up-down counter 31 are shown in the following table.

|   | COMPARATOR 47 | COMPARATOR 48 | Tc | Td | UP/DOWN |
|---|---|---|---|---|---|
| I | H | H | H | L | DOWN |
| II | L | H | L | L | — |
| III | L | L | L | H | UP |

Figure 4:
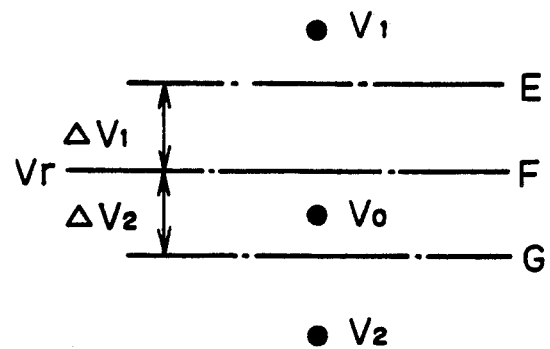
FIG. 4 is a view for explaining operations of the window comparator shown in FIG. 4.

Referring now to FIG. 4, there is shown operations of the window comparator 30, in which the reference voltage Vr is also represented as F, and the threshold level at the higher-level side is represented as E, while the threshold level at the lower-level side is represented as G. When the output $V_{01}$ of the detector 6 is at a level V1, the signal for causing the up-down counter 31 to operate in the down-operation mode is generated form the comparator 30, as seen from the table. Contrarily, when the output $V_{01}$ is at a level V2, the signal for causing the up-down counter 31 to operate in the up-operation mode is generated form he comparator 30. Further, when the output $V_{01}$ is at a level V0 between the levels E and G, the signal generated for the comparator 30 causes the up-down counter 31 to rest without an up or down operation. p Next, explanation will e made as to the operation of the specific embodiment.

When an incident of in feared light received in the PSD 24 is excessively strong due to, for example, an excessively short distance of the object, electric currents $I_1$ and $I_2$ having excessively large signal powers, receptively, are generated from the PSD 24, causing the detector 6 to generate an output signal $V_{01}$ having a level higher than that of the threshold level E (see FIG. 4). Accordingly, a down-mode control signal is supplied from the window comparator 30 to the up-down counter 31. In this case, the output terminal to be selected to generate the output signal of the counter 31 is successively changes in a direction from the output terminal 03 to the output terminal 01, and accordingly, the resistors to be selected to determine the gain of each of the amplifiers 2 and 3 are changed in a direction from the resistor R3 (R6) to the resistor R1 (R4), causing the amplifiers 2 and 3 to have a deceased gain. In this way, the levels of the output signals of the detectors 6 and 7 are lowered until the level of the output signal $V_{01}$ of the detector 6 enters between the levels E and G of the window comparator, and when the output level $V_{01}$ of the detector 6 is between the levels E and G of the window comparator, the output signals of the comparator 30 cannot cause the counter 31 to occur any changes therein.

On the other hand, when an incident of infrared lift received in the PSD 24 is excessively weak due to, for example, an excessively along distance to the object, electric currents $I_1$ and $I_2$ having excessively small signal powers, receptively, are generated from the PSD 24, causing the detector 6 to generate an output signal $V_{01}$ having a level lower tan that of the threshold level G (see FIG. 4). Accordingly, an up-mode control signal is supplied from the window comparator 30 to the up-down counter 31. In this case, the output terminal to be selected to generate the output signal of the counter 31 is successively changes in a direction from the output terminal 01 to the output terminal 03, and accordingly, the resistors to be selected to determine the gain of each of the amplifiers 2 and 3 are changed in a direction from the resistor R1 (R4) to the resistor R3 (R6), causing the amplifiers 2 and 3 to have an increased gain. In this way, the levels of the output signals of the detectors 6 and 7 are raised until the level of the output signal $V_{01}$ of the detector 6 enters between the levels E and G of the window comparator, and when the output level $V_{01}$ of the detector 6 is between the levels E and G of the window comparator, the output signals of the comparator 30 cannot cause the counter 31 to occur any changes therein.

While the invention has been described in conjunction with specific embodiments thereof, it is to be understood that many alternative and modifications will be apparent to those skilled in the art in light of the foregoing description.

For example, the output signal $V_{02}$ of the detector 7 may be used for operating the gain control circuit 8 in place of the output signal $V_{01}$ of the detector 6.

The oscillator 25 may be provided at the output side thereof with a frequency divider which generates an output signal or driving the LED 20 and which supplies the output signal to the detectors 6 and 7.

Each of the filters 4 and 5 may be made of a switched-capacitor filter in which capacitance thereof can be changed by a switch to change filter characteristics.

Further, the light emitting device may be made of any type of devices other than light emitting diode.

Further, the threshold levels, as well as the reference voltage, for determining the modes of the control signal which is to be generated from window comparator may have variable values.

Furthermore, the resistors in each of the resistor circuit may have the same resistance. In this case, the up-down counter is constructed to select one or more resistors in accordance with the modes of the control signal of the window-comparator. Further, resistors in each of the resistor circuit may be interconnected in parallel connections.

Accordingly, it is intended to include all such alternative and modifications as fall within the spirit and scope of the appended claims.

What is claimed is:

1. A distance measuring apparatus comprising a light emitting device for emitting infrared light blinking at a constant frequency toward an object, a light receiving device for receiving infrared light reflected from the object, the light receiving device being adapted to generated two output signals which correspond respectively to positive and negative amounts of deviation of a position of light received therein with respect to a center thereof, a pair of amplifiers for amplifying the output signals of the light receiving device, respectively, means for picking up signal components, each having a frequency corresponding of the blink frequency of the infrared light, from the output signals of the amplifiers, respectively, means for determining a distance to the object of the basis of the signal components picked up by the picking up means, and means or controlling a gain of each of the amplifiers, the controlling means including:

a pair of resistor circuits each having a changeable resistance for determining the gain of corresponding one of the amplifiers;

a comparator which compares in magnitude one of the signal components with a reference voltage and generates control signal having modes which change with the difference in magnitude between one of the signal components and the reference voltage; and means or changing the resistance of each of the resistor circuits in accordance with the modes of the control signals of the comparator.

2. A distance measuring apparatus according to claim 1, wherein the picking-up means includes:

a pair of filters which are connected to the amplifiers, respectively, to allowing certain frequencies of signals from the corresponding amplifier to pass while stoping others, the certain frequencies including a frequency corresponding to the blinking frequency of the infrared light; and a pair of detectors which are connected to the filters, respectively, to pick up a signal component having a frequency which corresponds to the blinking frequency of the infrared light foot signals passed through the corresponding filter.

3. A distance measuring apparatus according to claim 1, wherein each of the resistor circuits includes a plurality of resistors which are by-passed with switches, respectively, the switches being controlled by the changing means.

4. A distance measuring apparatus according to claim 3, wherein the resistors of each of the resistor circuits are connected to each other in a series, with opposite ends of each of the resistors connected to opposite ends of each of the switches, respectively.

5. A distance measuring apparatus according to claim 3, wherein h resistance changing means includes an up-down counter which is operative to selectively cause at least one of the switches of each of the resistor circuits to turn off in accordance with the modes of the control signals of the comparator.

6. A distance measuring apparatus according to claim 1, wherein the distance determining means is a differential amplifier.

7. A distance measuring apparatus according to claim 1, wherein when the one of the signal components is smaller in magnitude than the reference voltage at more than a predetermined value, the control signal of the comparator has a first mode which causes the resistance changing means to change the resistance of each of the resistor circuits so as to increase the gains of the amplifiers, and wherein when the one of the signal components is larger in magnitude than the reference voltage at more than a predetermined value, the control signal of the comparator has a second mode which causes the resistance changing means to change the resistance of each of the resistor circuits so as to decrease the gains of the amplifiers.

8. A distance measuring apparatus according to claim 3, wherein the resistors have resistances, respectively, which are different from one another.

* * * * *